Dec. 15, 1936.  S. C. SHIPLEY  2,063,898
CONTROL SYSTEM FOR AUTOMATIC STOKERS
Filed April 20, 1932  3 Sheets-Sheet 1

INVENTOR
SYLVANUS C. SHIPLEY
By Pauf, Pauf Moore
ATTORNEYS

Dec. 15, 1936.   S. C. SHIPLEY   2,063,898
CONTROL SYSTEM FOR AUTOMATIC STOKERS
Filed April 20, 1932   3 Sheets-Sheet 2

INVENTOR
SYLVANUS C. SHIPLEY
By Paul, Paul & Moore
ATTORNEYS

Dec. 15, 1936.  S. C. SHIPLEY  2,063,898
CONTROL SYSTEM FOR AUTOMATIC STOKERS
Filed April 20, 1932  3 Sheets-Sheet 3

INVENTOR
SYLVANUS C. SHIPLEY
By Paul, Paul & Moore
ATTORNEYS

Patented Dec. 15, 1936

2,063,898

UNITED STATES PATENT OFFICE 2,063,898

CONTROL SYSTEM FOR AUTOMATIC STOKERS

Sylvanus C. Shipley, Minneapolis, Minn., assignor to Minneapolis-Honeywell Regulator Company, Minneapolis, Minn., a corporation of Delaware Application April 20, 1932, Serial No. 606,440

5 Claims. (Cl. 236—9)

In the automatic control of coal stokers for domestic house heating purposes, it has been found in the past that during mild weather conditions the room thermostat only called for heat at prolonged intervals and that in the meantime, between calls for heat, the fire would often go out. As a result raw coal would be fed to the furnace but would not be ignited because the fire was out, which would result in filling the furnace with unburned coal. It was then necessary to clean out all this unburned coal and restart the fire. If mild weather continued, this same condition would occur over and over again causing a great deal of unnecessary labor and allowing the house to fall below the temperature at which it was desired to maintain the same.

In order to overcome this difficulty it has been proposed to provide a device which would operate the stoker even though the house was not calling for heat, in order that the fire would be maintained at all times and ready to receive more coal whenever the house became cold. One method of accomplishing this result was the provision of a program switch, or timer, which operated the stoker for five minutes every hour, which period of firing was deemed sufficient to maintain fire in the furnace even though the room thermostat did not start the stoker because of coldness in the house. Another method of maintaining the stoker fire was the provision of a thermostatic device which responded to the temperature of the fire itself, the temperature of the products of combustion passing through the stack or the temperature of the boiler water which was heated by the fire. In this manner, whenever any one of these temperatures (depending upon the type of control used) fell below a pre-determined minimum, the stoker would be started up by the thermostatic device to build up the fire sufficiently to prevent its going out.

In spite of these precautions, it has been found that sometimes the fires still go out allowing the furnace to be filled with unburned coal, in the same manner as in the old systems wherein no fire maintaining means were provided. If anything, the condition is even worse with one of the improved systems of control when the fire goes out, since the stoker is operated either once every hour or as a result of minimum heat conditions at the furnace, in addition to its being operated by the room thermostat when the house became cold. In the case of these improved systems, therefore, when the fire becomes extinguished, the furnace will be filled with unburned coal even more quickly than would be the case in the old systems, in spite of the precautionary measures taken.

One of the objects of the present invention, therefore is the provision in combination with an automatic control system for stokers, of a device which will prevent the operation of the stoker at any time when the fire has become extinguished.

More specifically, this invention resides in the provision of a thermostatic device subject to a furnace condition such as the temperature of the boiler water, the temperature of the fire itself or the temperature of the products of combustion, which device will open the stoker circuit whenever the temperature falls below a predetermined point, indicating that in all probability the fire has become extinguished.

This invention is intended to cover the use of such devices in any type of stoker control system whether or not it is provided with a means for preventing extinguishment of the fire and regardless of the type of such means if one is used.

A further object of the invention is the provision of a device which will prevent operation of the stoker if it appears that the stoker fire has become extinguished, but which will, if the stoker fire should for any reason increase in intensity, automatically restore the system to normal control.

Still another object of my invention is the provision of a device which will prevent operation of the stoker if it appears that the stoker fire has been extinguished, but in which the device may be set manually when the fire is rekindled, so that the system will resume automatic operation when the fire once more reaches its normal proportions.

A further object of the invention is the provision of an improved thermostatic switch for carrying out the above improvements in stoker control systems.

While in the following description, certain specific embodiments of the invention will be described, it is to be understood that there are many other ways of carrying out the object of this invention and it is not intended to be limited by the specific details hereinafter disclosed.

For a further understanding of the invention, reference may be had to the following description and accompanying drawings, in which:

Figure 1 is a wiring diagram showing the invention in conjunction with a single contact room thermostat and thermostatic means for preventing the extinguishment of the fire;

Figure 2 discloses a system of stoker control embodying the present invention in conjunction with a holding circuit type of room thermostat operating on low voltage and with the stoker operating on high voltage;

Figure 4:
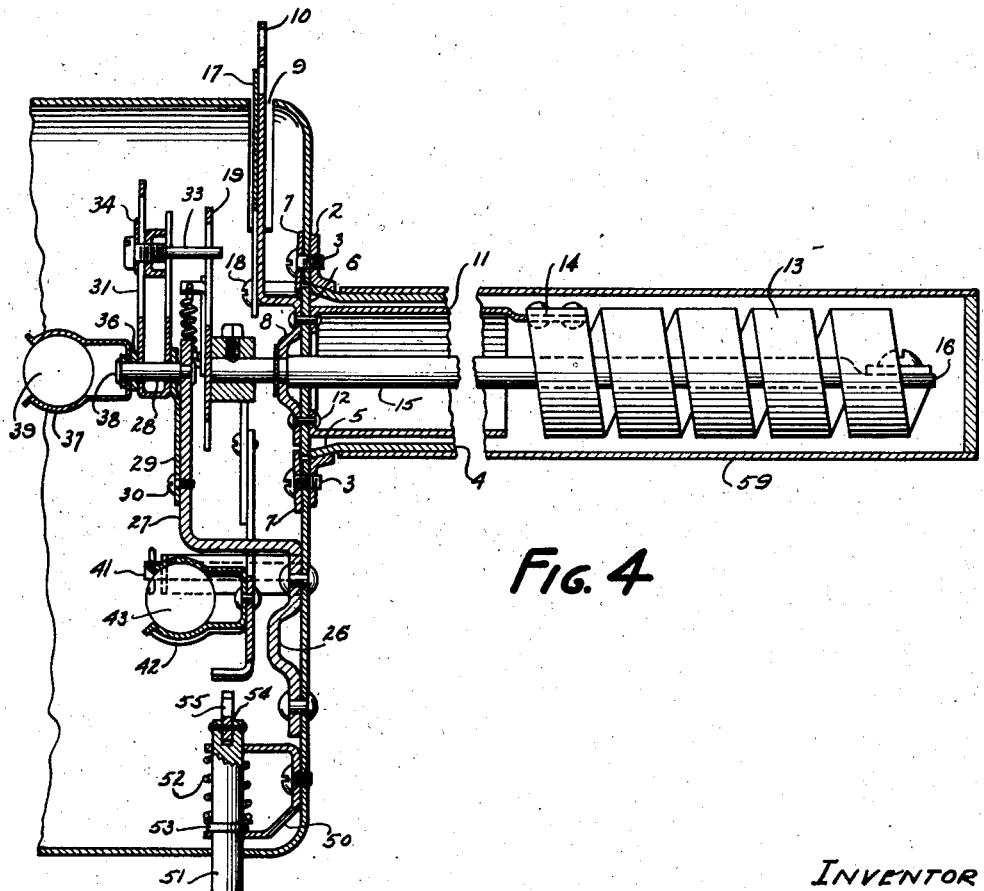
Figure 4 is a longitudinal section of my improved stoker switch taken about on line 4—4 of Figure 5.
Figure 5:
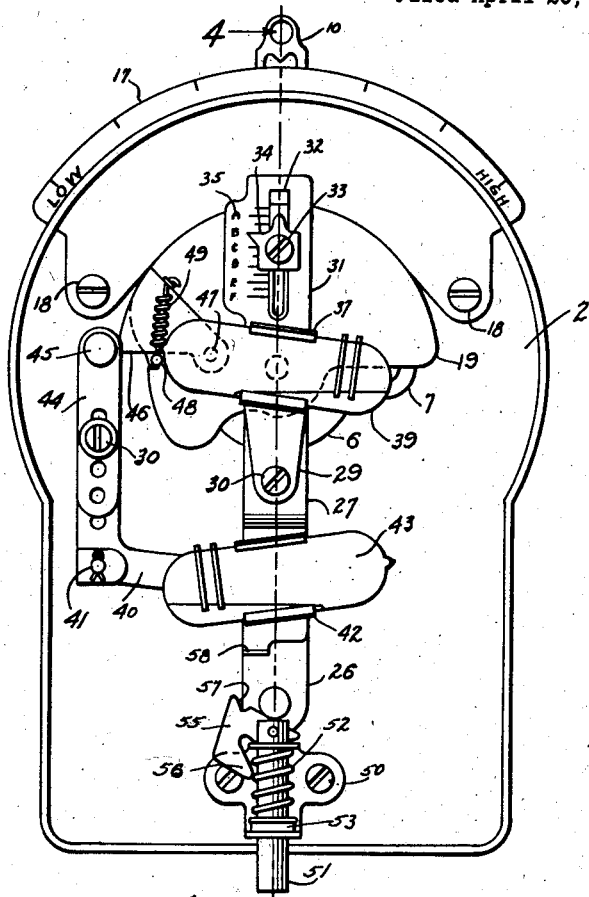
Figure 5 is a front view of my improved stoker switch.
Figure 6:
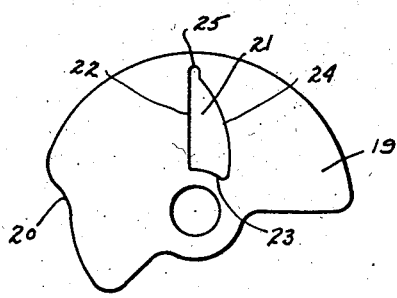
Figure 6 shows one of the details of my improved stoker switch.

Referring first to Figures 4, 5, and 6, it will be noted that the stoker switch is housed in a case 1, which is provided with an opening surrounded by flange 2, secured in place by screws 3. A tubular extension 4 is provided with an expanded end 5 and this tubular extension is passed through the opening in case 1 so that its expanded end 5 engages flange 2. A disc 6 substantially fills the opening in case 1 and abuts the periphery of the expanded end 5 of tubular extension 4 and this disc is held in place by means of washers 7 which are secured by screws 3. An operating handle 8 is secured to disc 6 by any suitable means, such as rivets, and extends through a slot 9 in case 1 and terminates in an indicator 10. A tubular member 11 which is concentric with and inside of extension 4 is secured at one end to disc 6, by means of inturned lugs, as shown at 12, and its other end is secured to one end of a helically coiled bimetallic element 13, as indicated at 14. A shaft 15 has one of its ends secured to the free end of bimetallic element 13, as shown at 16, and extends through the coil formed by this element, through disc 6, operating handle 8 and into the interior of case 1. A scale plate 17 is secured to the interior of case 1 by any suitable means, such as the screws shown at 18, and extends through slot 9 in case 1. Scale plate 17 is provided with high, low and intermediate graduations for co-operation with indicator 10 in order that the base temperature to which the device responds may be adjusted.

A cam plate 19, which is secured to collar 20, is mounted on the free end of shaft 15 by means of said collar. The cam plate 19 is substantially semi-circular in shape but has a cam surface provided in its periphery, as shown at 20. Cam plate 19 is also provided with a slot 21 of irregular shape. The slot 21 is provided with a straight radial portion 22, a lower arcuate portion 23, a curved side 24, and an elongated portion 25. The peculiar form of this slot has a very definite purpose which will be brought out hereinafter. A bracket 26 is secured to case 1 below shaft 15 and is provided with an upwardly extended portion 27 provided with an opening which is in alignment with shaft 15. A pin 28 passes through this opening and is secured to extension 27. A leaf spring 29 has one end secured to extension 27, as shown at 30, and its other end is provided with an opening so as to allow the passage of pin 28 therethrough. A U-shaped actuated member 31 is pivoted on pin 28 and the upwardly extending legs thereof are provided with slots 32. A pin 33 extends through the slots 32 and into slot 21 and also clamps an indicator 34 to one of the legs of member 31, which indicator co-operates with graduations 35 carried by said leg. A star shaped friction washer 36 is next placed on pin 28 followed by a mercury switch holder 37 and then a washer 38 after which pin 28 is peened over. Leaf spring 29 exerts pressure against member 31 so that member 31 and switch holder 37 are coupled together by means of friction washer 36 and at all times rotate together about pin 28. The pressure exerted by leaf spring 29 is sufficient to maintain member 31 and mercury switch holder 37 in any position to which they may be moved. A mercury switch 39 is carried by holder 37. This mercury switch will hereinafter be termed the "fire maintaining switch".

The operation of this part of the device is as follows: With the indicator 10 set at any desired point, temperature changes at the bimetallic element 13 result in rotation of shaft 15 which in turn rotates cam plate 19. The edges formed by slot 21 engage pin 33 to move member 31 and in turn tilt the mercury switch 39. It will be noted that the graduations 35 are evenly spaced and in order for each graduation to represent the same number of degrees in temperature change, it has been necessary to provide the peculiar configuration of slot 21. With pin 33 moved up to such a position that indicator 34 is opposite graduation A, the extended end of pin 33 will be in the elongated portion designated 25 of slot 21. Under these conditions, as cam plate 19 is rotated back and forth in response to temperature changes at bimetallic element 13, fire maintaining switch 39 will be tilted back and forth without any lost motion. As indicator 34 is moved downwardly to positions B, C, D, etc., the end of pin 33 will move into progressively wider parts of the slot 21 so that there will be an increased amount of lost motion between cam plate 19 and pin 33 so as to provide an adjustable differential in the operation of fire maintaining switch 39. It has been formerly stated the pressure exerted by leaf spring 29 is sufficient to hold fire maintaining switch 39 and member 31 in any position to which it may be moved by the lost motion connection provided by pin 33 and slot 21. In former instruments, the mercury switch, after having moved past the center, has been allowed to continue rotating by gravity to the extent of the lost motion connection. This feature has been eliminated herein for a specific reason since it has been found that the lead wires to the mercury switch tend to hold the mercury switch in some one of its positions and even tend to move the switch back to such position when the force acting thereon has been removed. The pressure set up by leaf spring 29 is sufficient to overcome this tendency of the leads of the mercury switch and maintains it in any position to which it is moved by cam plate 39. The result is positive and accurate operation of the instrument. Adjustment of indicator 10 rotates tubular member 11 to adjust the fixed end of the bimetallic element 13 so as to change the base temperature setting of the instrument.

A bell-crank 40 is pivoted on a pin 41 carried by case 1 and has a substantially horizontal arm to which is secured a mercury switch holder 42, which in turn carries a mercury switch 43. This mercury switch will hereafter be termed the "lock-out switch." The other arm of the bell-crank is substantially vertically disposed and is provided with an adjustable extension 44 which carries a pin 45 at its end, the pin being adapted to co-operate or ride upon the periphery of cam plate 19. A cam 46 is pivoted to cam plate 19, as shown at 47, and is biased normally into engagement with a pin 48 by means of a coiled spring 49. The cam 46, when it is in engagement with pin 48, serves as an extension of the periphery of cam plate 19, so that in effect the periphery of the cam plate 19 extends in a perfect radius beyond the cut-in cam portion 20. A bracket 50 is secured to the lowermost portion of case 1 and journals a vertical movable rod 51 which is normally biased to move downwardly by means of a spring 52, one end of which abuts the bracket 50 and the other end of which abuts a washer secured to or an enlarged portion 53 formed in rod 51. The upper portion of rod 51 is slotted as at 54 to pivotally receive a catch 55. Catch 55 is provided with a downwardly extending finger 56 and also with a notch 57 located at its upper portion. The substantially horizontal arm of bell-crank 40 is provided with a bent-over extension 58 which overlies catch 55 and under certain conditions engages notch 57.

The part of the thermostatic switch just described above comprises the means for shutting down the stoker when the fire goes out. When the fire in the furnace goes out the temperature of element 13 falls to such a degree that cam plate 19 is rotated in a clockwise direction until pin 45 rides over the periphery of cam 46 and drops against the portion 20 of cam plate 19, which allows bell-crank 40 to rotate clockwise about pin 41 moving lock-out switch 43 to open circuit position. If for any reason the temperature drops far enough to cause the opening of lock-out switch 43 and then due to a change of wind direction or for some other cause the fire picks up, increasing the temperature of element 13, cam plate 19 will be rotated in a counter-clockwise direction. Pin 45 will bear against the lower edge of cam 46 rotating the same in a clockwise direction against the action of the spring 49. On continued rise in temperature pin 45 will ride up cam surface 20 until it reaches the radial periphery of cam plate 19 whereupon cam 46 will be returned to its normal position abutting pin 48. Cut-out switch 43 is moved to closed position by this action.

It should be noted that there is a temperature differential between opening of lock-out switch 43 and closing thereof under these conditions. In order for lock-out switch 43 to open, the temperature at thermostatic element 13 must drop to such a point that pin 45 rides off cam 46 which is then in engagement with pin 48 to extend the periphery of plate 19. For lock-out switch 43 to close automatically, however, the temperature must rise sufficiently for pin 45 to rotate cam 46 about its pivot and ride up on cam surface 20 until it engages the radial periphery of cam plate 19.

Figure 5A:
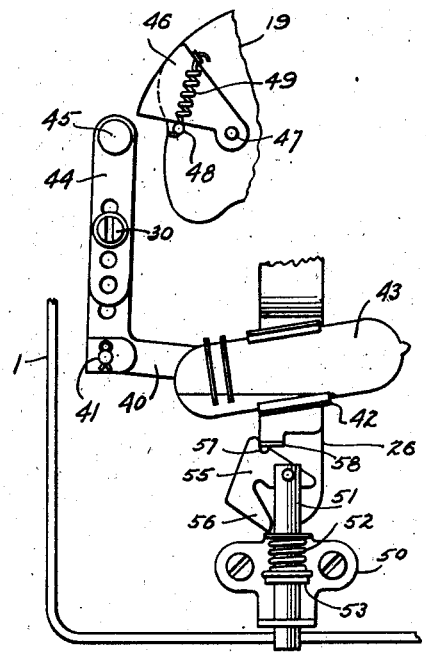
Figure 5A is a fragmentary front view showing the lock-out switch held closed by the manually operable means for this purpose.

The stoker cannot be operated when lock-out switch 43 has moved to open circuit position as will be hereinafter more fully explained. If the fire goes completely out, it may of course be re-kindled manually and built up until the temperature to which element 13 responds has become sufficiently high to move lock-out switch 43 to closed circuit position after which automatic operation will be resumed as above explained. Ordinarily, however, it will be desired to only start the fire manually and then let the stoker build up the fire. In order to accomplish this result it is necessary that lock-out switch 43 may be manually moved to closed circuit position and then maintained in that position until the temperature of element 13 becomes sufficiently high to hold lock-out switch in closed circuit position by means of cam plate 19 and cam 46. If this operation is desired, the rod 51 is moved upwardly until finger 56 of catch 55 rests on bracket 50 and the left hand edge of slot 57 engages the left side of extension 58 and moves bell-crank 40 in counter-clockwise direction until lock-out switch 43 is in closed circuit position (see Fig. 5A). This movement of bell-crank 40 positions pin 45 so that it will readily ride upon cam 46 when the temperature of element 13 has been restored. Rod 51 is maintained in its raised position by finger 56 resting on bracket 50 and 56 is held in this position by the engagement of notch 57 with the left side of extension 58. When the temperature of element 13 rises sufficiently cam 49 will move counter-clockwise until it picks up pin 45 and moves it slightly to the left. This causes extension 58 to be moved up out of engagement with notch 57 whereupon spring 52 will move rod 51 down to the position shown in Figure 5.

It will be noted that this combined instrument has several adjustments. First the indicator 10 may be moved to adjust what might be called the base temperature at which the fire maintaining switch 39 will be moved to closed position by engagement of pin 33 with straight portion 22 of slot 21. Adjustment of pin 33 vertically changes the differential between opening and closing movements of switch 39 and, lastly, adjustable extension 44 changes the temperature at which lock-out switch 43 will be operated in relation to the base temperature setting.

In order to protect bimetallic element 13 from the corrosive effects of the products of combustion, a protecting tube 59 may be provided if desired.

Figure 1:
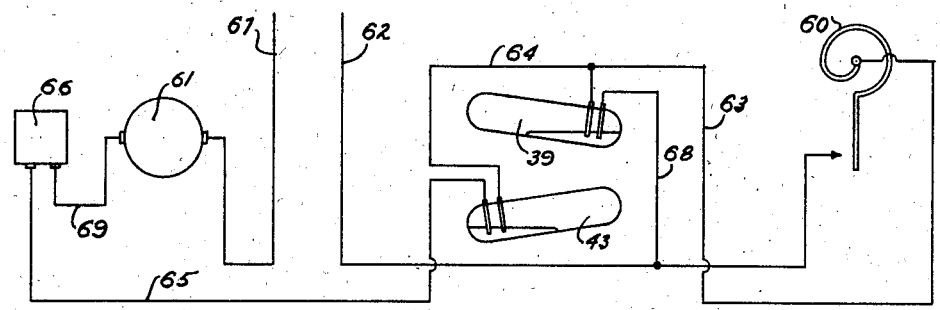

Referring now to Figure 1, there is shown a simple circuit diagram showing the manner in which this device is used in a stoker control system to prevent operation of the stoker if the fire becomes extinguished. A single contact room thermostat is indicated at 60 and upon closure of the room thermostat on a call for heat, stoker motor 61 is energized through the following circuit: Line 62, room thermostat 60, conductor 63, conductor 64, lock-out switch 43, conductor 65, limit control 66, stoker motor 61 and line 67. It will be noted that the room thermostat cannot start stoker motor 61 if lock-out switch 43 is in open circuit position. If the room is sufficiently warm but the temperature condition of the furnace drops to such a degree that the fire might go out, fire maintaining switch 39 is moved to closed position establishing the following circuit: line 62, conductor 68, fire maintaining switch 39, conductor 64, lock-out switch 43, conductor 65, limit control 66, conductor 69, stoker motor 61 and line 67. It will again be noted that the fire maintaining means represented by mercury switch 39 is unable to operate the stoker motor 61 if the lock-out switch 43 is in open circuit position.

Figure 2:
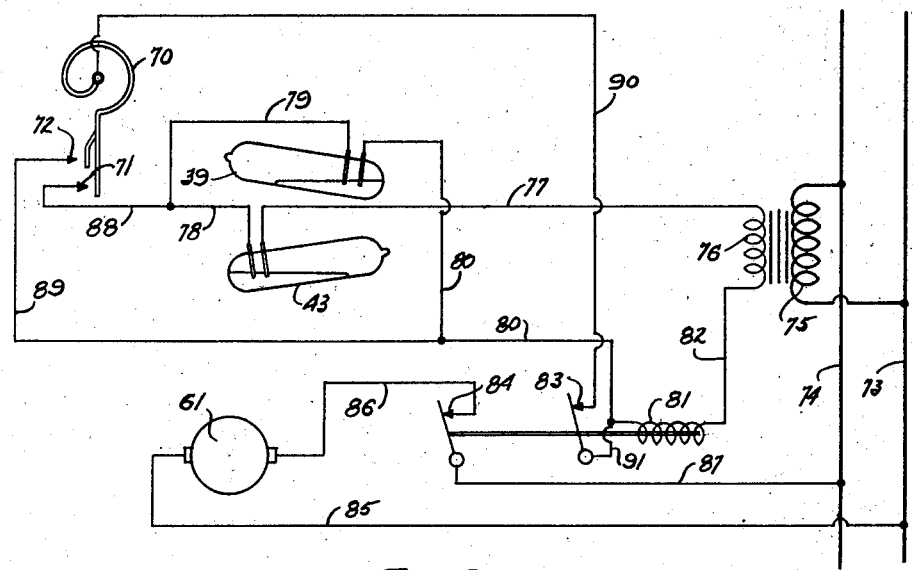

Figure 2 shows another manner of utilizing my novel control system in which low voltage is used in all of the circuits except that of the stoker motor 61. This circuit also utilizes the holding circuit type of room thermostat indicated at 70 which is provided with contacts 71, 72. Contact 71 makes prior to 72 on a fall in temperature and breaks after 72 on a rise in temperature. Lines 73 and 74 supply current to the primary 75 of a transformer. The room is shown as warm but the fire maintaining switch 39 is closed, setting up the following circuit: secondary 76 of the transformer, conductor 77, lock-out switch 43, conductors 78, 79, fire maintaining switch 39, conductor 80, relay coil 81 and conductor 82 to secondary 76. Energization of relay coil 81 has closed switches 83 and 84, the latter of which energizes stoker motor 61 as follows: line 73, conductor 85, stoker motor 61, conductor 86, switch 84 and conductor 87. It will be noted that the circuit for relay coil 81 cannot be completed unless lock-out switch 43 is in closed circuit position. When the fire has been built up sufficiently, switch 39 will open and de-energize relay coil 81 to thereby discontinue operation of stoker motor 61. If the room temperature falls, contact 71 first closes and then contact 72 closes setting up the following circuit for relay coil 81: secondary 76, conductor 77, lock-out switch 43, conductors 78, 88, contacts 71 and 72, conductors 89, 80, relay coil 81 and conductor 82 back to secondary 76. Energization of relay coil 81 again closes relay switches 83 and 84, the latter of which energizes stoker motor 61 as above explained and the former of which closes a holding circuit for relay coil 81 which is dependent only on contact 71 and not on contact 72. This holding circuit is as follows: secondary 76, conductor 77, lock-out switch 43, conductors 78, 88, contact 71, thermostat 70, conductor 90, switch 83, conductor 91, relay coil 81 and conductor 82 back to 76. It will be noted that here again both the starting circuit and the holding circuit for relay coil 81, as energized by the room thermostat 70, are dependent upon lock-out switch 43 being in the closed circuit position.

Figure 3:
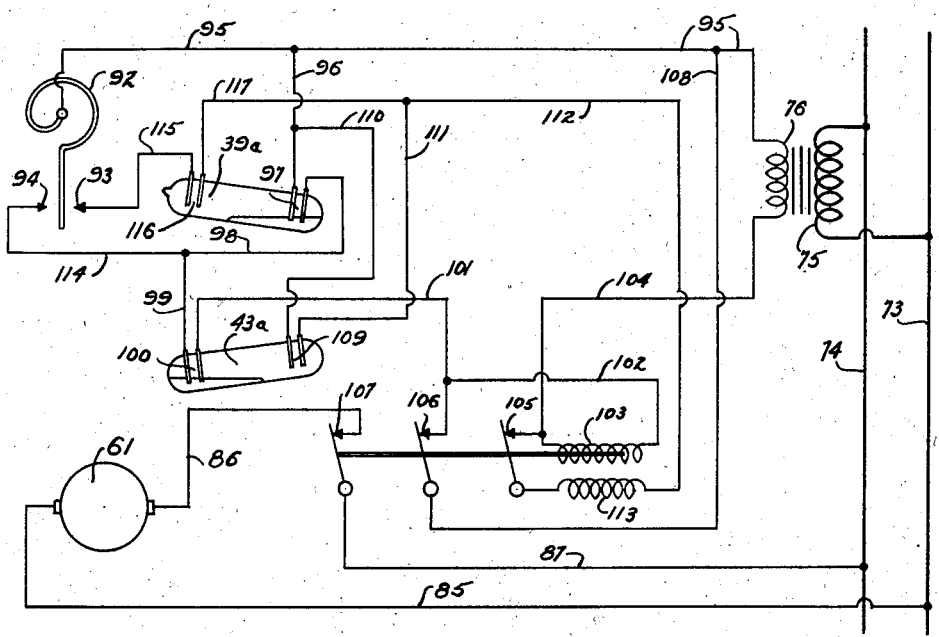
Figure 3 is a wiring diagram showing the present invention applied to a double contact type of room thermostat.

Figure 3 shows the manner in which my invention may be applied to a double contact type room thermostat. In this instance the fire maintaining switch 39a and the lock-out switch 43a are of the type which make a circuit in both their hot and cold positions. The parts in Figure 3 are shown with the lock-out switch 43a in hot position and the fire maintaining switch 39a in cold position and the room thermostat 92 midway between its hot and cold contacts 93 and 94 respectively. The line wires, and primary and secondary of the transformer are again denoted 73, 74, 75, and 76 respectively. With 39a in its cold position the following circuit is set up: secondary 76, conductor 95, conductor 96, cold contacts 97 of fire maintaining switch 39a, conductors 98, 99, hot contacts 100 of lock-out switch 43a, conductors 101, 102, pull coil 103 of the relay unit and conductor 104 back to secondary 76. Energization of 103 closes switches 105, 106, and 107, the latter of which controls the stoker motor 61 as in Figure 2. Contacts 106 establish the following holding circuit for relay coil 103: secondary 76, conductor 95, conductor 108, switch 106, conductor 102, pull coil 103, conductor 104 to 76. It will be seen that opening of contacts 97 or 100 will not de-energize pull coil 103. If the fire should die out, however, cold contacts 109 of lock-out switch 43a would be closed, setting up the following circuit: secondary 76, conductors 95, 96, 110, cold contacts 109 of lock-out switch 43a, contactors 111, 112, neutralizing coil 113, contacts 105, and conductor 104 to secondary 76. The magnetic effect of neutralizing coil 113 neutralizes the magnetic effect of pull coil 103 allowing switches 105, 106, and 107 to open by gravity. Such relays are old in the art of automatic controls. If the room becomes cold, closing contacts 94, an energizing circuit for pull coil 103 is established as follows: secondary 76, conductors 95, 92, 94, conductors 114, 99, hot contacts 100 of lock-out switch 43a, conductors 101, 102, pull coil 103, and 104 back to secondary 76. It will be seen that this energizing circuit again is dependent upon the lock-out switch 43 being in its hot position. Energization of coil 103 again closes switches 105, 106, and 107 as above explained. With the stoker operating and the fire burning, both the room thermostat 92 and the fire maintaining switch 39a must reach their hot positions before the stoker will be shut down. This circuit for energizing neutralizing coil 113 to allow switches 105, 106, and 107 to open is as follows: secondary 76, 95, 92, contacts 93, conductor 115, hot contacts 116 of fire maintaining switch 39a, conductors 117, 112, neutralizing coil 113, switch 105, and conductor 104 to 76.

From the foregoing it will be seen that by my invention I have provided an improvement in stoker control systems which may be applied to any of the well known thermostatic control circuits. Although no high limit control has been shown in the diagrams of Figures 2 and 3, they could well be inserted since such instruments are standard devices which are on the open market.

Although in all of the description and drawings mercury switches have been used in the device which is subject to furnace conditions, it is to be understood that open contacts could easily be substituted without changing the operation of the various systems. Likewise, mercury switch room thermostats could be substituted for the open contact room thermostat shown and described.

It should be further understood that my novel lock-out control for preventing operation of the stoker when the fire has become extinguished can equally well be applied to those stoker systems in which it is attempted to maintain the fire at all times by timed firing periods instead of by a minimum heat condition as described and explained herein.

This means of preventing operation of the stoker may also be applied to those systems in which the fire maintaining mechanism for maintaining the fire during periods of mild weather is omitted.

In the claims, the term "fire maintaining switch" will be used to include any switching mechanism (open contacts or mercury switches, temperature responsive or time controlled) which is intended to prevent extinguishment of the fire during mild weather or low heat requirement conditions. The term "lock-out switch" will be used to include any switching mechanism for preventing operation of the stoker when the fire is extinguished. The expression "responsive to a furnace condition" will include any condition directly responsive to the temperature of the fire such as temperature of the products of combustion in the combustion pot, stack or intermediate passages, the temperature of the fuel bed or heat given off thereby or the temperature or pressure of the fluid circulating medium at the furnace or boiler and heated thereby. The expression "temperature of the products of combustion" will include the temperature of the fuel bed or gases leaving the same and passing to the chimney of the furnace to boiler. The term "mercury switch" as used in the claims is intended to include only those switches which are self contained and comprise an envelope, two or more electrodes therein and a fluid body of conducting material for bridging said electrodes when the envelope is tilted in one direction.

I claim as my invention:

1. In a system for controlling the temperature of a space having a furnace, the combination of, means for supplying fuel to the furnace, means responsive to space temperatures for controlling said fuel supplying means, means responsive to furnace temperatures for preventing operation of said fuel supplying means when the fire becomes substantially extinguished, and latch means for operating said last mentioned responsive means to permit operation of said fuel supplying means.

2. In a system for controlling the temperature of a space having a furnace, the combination of, means for supplying fuel to the furnace, means responsive to space temperatures for controlling said fuel supplying means, means responsive to furnace temperatures for preventing operation of said fuel supplying means when the fire becomes substantially extinguished, latch means for operating said last mentioned responsive means to permit operation of said fuel supplying means, and means for releasing said latch means and controlling said last mentioned responsive means when the fire is restored.

3. In a system for controlling the temperature of a space having a furnace, the combination of means for supplying fuel to the furnace, means responsive to space temperatures for controlling said fuel supplying means, means responsive to furnace temperature for controlling said fuel supplying means, means responsive to furnace temperatures for preventing operation of said fuel supplying means by either of said responsive means if the fire becomes substantially extinguished, and latch means for operating said last mentioned responsive means to permit operation of said fuel supplying means.

4. In a system for controlling the temperature of a space having a furnace, the combination of means for supplying fuel to the furnace, means responsive to space temperatures for controlling said fuel supplying means, means responsive to furnace temperature for controlling said fuel supplying means, means responsive to furnace temperatures for preventing operation of said fuel supplying means by either of said responsive means if the fire becomes substantially extinguished, latch means for operating said last mentioned responsive means to permit operation of said fuel supplying means, and means for releasing said latch means and controlling said last mentioned responsive means when the fire is restored.

5. In a system having a furnace for controlling the temperature of a space, the combination of means for supplying fuel to the furnace, means responsive to space temperatures for controlling said fuel supplying means, means to operate said fuel supplying means to maintain the fire alive when the system is operating under low heat requirement conditions, means responsive to furnace temperatures for preventing operation of said fuel supplying means either by said space temperature responsive means or said last named means if the fire becomes substantially extinguished, and latch means for operating said last mentioned responsive means to permit operation of said fuel supplying means.

SYLVANUS C. SHIPLEY.